(12) United States Patent
Morito et al.

(10) Patent No.: US 7,110,146 B1
(45) Date of Patent: Sep. 19, 2006

(54) DATA CONVERTING APPARATUS, METHOD FOR CONVERTING DATA AND COMPUTER-READABLE RECORDING MEDIUM RECORDED WITH A PROGRAM FOR CAUSING A COMPUTER TO CONVERT DATA

(75) Inventors: Hironori Morito, Kawasaki (JP); Kohki Yahisa, Kawasaki (JP); Junko Komine, Kawasaki (JP); Mika Terai, Kawasaki (JP); Hideki Kawamoto, Kanazawa (JP); Akira Higashino, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/537,342

(22) Filed: Mar. 29, 2000

(30) Foreign Application Priority Data

Jun. 25, 1999 (JP) .................................. 11-180229

(51) Int. Cl.
*H04N 1/387* (2006.01)
(52) U.S. Cl. ..................... 358/450; 358/403; 358/448; 382/305
(58) Field of Classification Search ................ 358/450, 358/403, 443, 448, 540; 382/302, 305
See application file for complete search history.

(56) References Cited

U.S. PATENT DOCUMENTS

| | | | | |
|---|---|---|---|---|
| 4,542,378 A | * | 9/1985 | Suganuma et al. ......... 358/450 |
| 5,103,490 A | * | 4/1992 | McMillin ................... 382/284 |
| 6,026,187 A | * | 2/2000 | Siegel ........................ 358/450 |
| 6,209,004 B1 | * | 3/2001 | Taylor ........................ 715/500 |
| 6,370,280 B1 | * | 4/2002 | Cok et al. ................... 382/284 |
| 6,594,405 B1 | * | 7/2003 | Flannery .................... 358/450 |

FOREIGN PATENT DOCUMENTS

| | | |
|---|---|---|
| JP | 8-207376 | 8/1996 |
| JP | 9-188023 | 7/1997 |
| JP | 10-162092 | 6/1998 |

* cited by examiner

*Primary Examiner*—Thomas D. Lee
(74) *Attorney, Agent, or Firm*—Staas & Halsey LLP

(57) ABSTRACT

In a data converting apparatus, a data converting part converts a set of input data into a set of image data that can be processed by an image forming apparatus forming an image on a medium in accordance with the set of image data and a superimposing part superimposes at least two sets of image data converted from at least two different sets of input data so as to generate a single set of superimposed image data. By sending the single set of superimposed image data to the image forming apparatus, the image forming apparatus can form an image on the medium based on the single set of superimposed image data.

26 Claims, 9 Drawing Sheets

| ADDRESS | | | | |
|---|---|---|---|---|
| NAME | ZIP CODE | ADDRESS | TEL. | FAX |
| Taro Tokyo | 100-0001 | CHIYODAKU, TOKYO | 03-9999-9999 | 03-9999-9998 |
| Yoshiko Choshi | 141-0021 | SHINAGAWAKU, TOKYO | 03-8888-8888 | 03-8888-8887 |
| Reiko Ohba | 173-0015 | NERIMAKU, TOKYO | 03-7777-7777 | 03-7777-7776 |
| Takao Ingi | 160-0007 | SHIBUYAKU, TOKYO | 03-6666-6666 | 03-6666-6665 |
| …… | …… | …… | …… | …… |
| | | | | |
| | | | | |
| | | | | |
| | | | | |
| | | | | |
| | | | | |

9c

| ADDRESS | | | | |
|---|---|---|---|---|
| NAME | ZIP CODE | ADDRESS | TEL. | FAX |
| | | | | |
| | | | | |
| | | | | |
| | | | | |
| | | | | |
| | | | | |
| | | | | |

9a

```
** **   100-0001   Tokyo***···   03-9999-9999   03-9999-9998
** **   141-0021   Tokyo***···   03-8888-8888   03-8888-8887
** **   173-0015   Tokyo***···   03-7777-7777   03-7777-7776
** **   160-0007   Tokyo***···   03-6666-6666   03-6666-6665
   ……      ……         ……            ……             ……
```

9b

DATA CONVERTING APPARATUS, METHOD FOR CONVERTING DATA AND COMPUTER-READABLE RECORDING MEDIUM RECORDED WITH A PROGRAM FOR CAUSING A COMPUTER TO CONVERT DATA

BACKGROUND OF THE INVENTION

1. Field of the Invention

The present invention generally relates to data converting apparatuses, methods for converting data and computer-readable recording media recorded with a program for causing a computer to convert data, and more particularly to a data converting apparatus, a method for converting data and a computer-readable recording medium recorded with a program for causing a computer that can superimpose input data on a predetermined form so as to print superimposed data without a special application for superimposing data.

Recently, in a printing apparatus connecting to a computer, especially, in a case in which an overlay printing that superimposes data is required, it is desired that a user can realize the overlay printing by the same operation as a usual printing operation from the computer connecting to the printing apparatus, instead of using an overlaying printing application that limits usage.

2. Description of the Related Art

In a conventional overlay printing system, generally, the following methods are used.

In a case in which an Operating System (OS) has a function for superimposing data, a special computer application is used to generate an overlay data format (for example, a storage address) in accordance with the function of the OS.

In another case in which the OS does not have the function for superimposing data, another special application having a function (for example, a function superimposing a predetermined overlay form and a set of data for a page) corresponding to the function mentioned above of the OS is used or a user creates a document by merging a fixed overlay form with a set of data on the computer.

However, in the conventional overlay print system, there are some disadvantages.

In the case in which the OS has a function for the overlay print, the system requires a special application to make the most of the OS. In this case, there is a disadvantage limiting usage such that it always requires a user to use the special application to make the overlay form and information such as an input data or text data. Also, a variation for the overlay form and information to be superimposed is limited. Accordingly, it requires the user to learn how to use the special application and an installation expense is also required.

Moreover, in the case in which the OS does not include the function for the overlay print, for example, Microsoft© Windows© system achieves the overlay print as described below.

The overlay print on the Microsoft® Windows© system limits one document, that is, one file to print out. Thus, it is impossible to superimpose data of two different files and print out. Accordingly, it requires a special application that superimposes two different files per page so as to make one file. As a result, the special application creates a large amount of data while two different files are superimposed page by page. The created large amount of data reduces a print performance. In addition, when a remote user attempts the overlay print via a network, the large amount of data occupies the communication path and causes a decrease of throughput performance of a LAN or the like. Hence, these disadvantages effect operations of other systems or applications.

SUMMARY OF THE INVENTION

It is a general object of the present invention to provide a data converting apparatus, a method for converting data and a computer-readable recording medium that can superimpose input data on a predetermined form so as to print superimposed data, instead of using a special application for superimposing data, in which the above-mentioned problems are eliminated.

A more specific object of the present invention is to provide a data converting apparatus, a method for converting data and a computer-readable recording medium such that a current OS can be utilized and a user can print superimposed data without using a special application.

The above objects of the present invention are achieved by a data converting apparatus including: a data converting part converting a set of input data into a set of image data that can be processed by an image forming apparatus forming an image on a medium in accordance with the set of image data; a superimposing part superimposing at least two sets of image data converted from at least two different sets of input data so as to generate a single set of superimposed image data; and a data sending part sending the single set of superimposed image data to the image forming apparatus, wherein the image forming apparatus forms a single image on the medium based on the single set of superimposed image data.

According to the present invention, it is possible for a user to print a set of superimposed data such that two different data files are superimposed to be one data file, without any special application. Also, no special operation is not required for the user to print the superimposed data.

The above objects of the present invention are achieved by a method for converting data including the steps of: (a) converting a set of input data into a set of image data that can be processed at an image forming apparatus forming an image on a medium in accordance with the set of image data; and (b) superimposing at least two sets of image data converted from at least two different sets of input data so as to generate a single set of superimposed image data, wherein the image forming apparatus forms a single image on the medium based on the single set of superimposed image data.

According to the present invention, the method for converting data can be provided so that a user can print a set of superimposed data such that two different data files are superimposed into one data file, without any special application. Also, no special operation is required for the user to print the set of superimposed data.

The above objects of the present invention are achieved by a computer-readable recording medium recorded with a program for causing a computer to convert data, said program including the steps of: (a) converting a set of input data into a set of image data that can be processed at an image forming apparatus forming an image on a medium in accordance with the set of image data; and (b) superimposing at least two sets of image data converted from at least two different sets of input data so as to generate a single set of superimposed image data, wherein the image forming apparatus forms a single image on the medium based on the single set of superimposed image data.

According to the present invention, the computer-readable recording medium recorded with a program for causing a computer to convert data can be provided so that a user can print a set of superimposed data such that two different data files are superimposed to be one data file, without any special application. Also, no special operation is required for the user to print the set of superimposed data.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
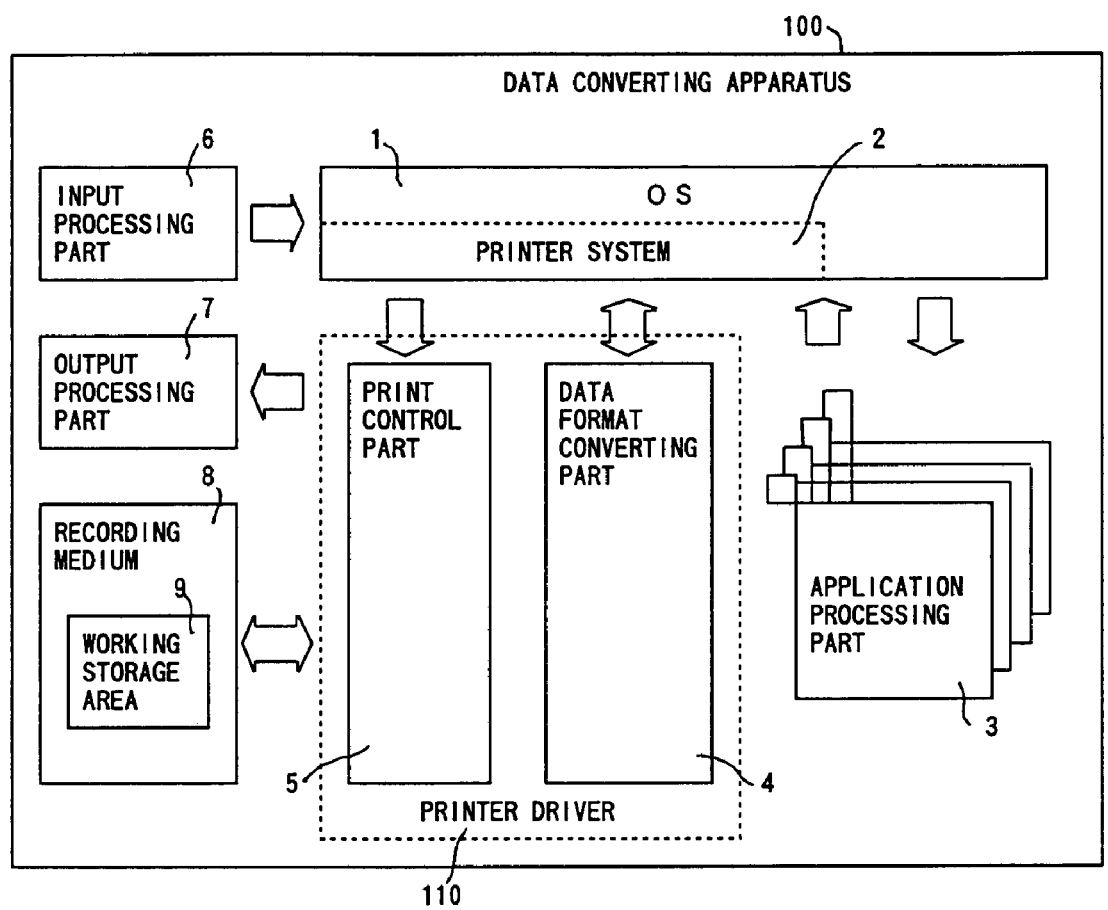
FIG. 1 is a diagram showing a system construction according to an embodiment of the present invention.

FIG. 1 is a diagram showing a system construction according to an embodiment of the present invention.

In FIG. 1, a data converting apparatus 100 includes a printer driver 110, an OS (Operating System) 1, a printer system 2 of the OS, an application processing part 3, a data format converting part 4 for the printer driver 110, a print control part 5 for the printer driver, an input processing part 6, an output processing part 7, a recording medium 8 and a working storage area 9.

The printer driver 110, the data format converting part 4 and print control part 5 execute an overlay control program that is described later.

The OS 1 is an operating system on a personal computer (hereinafter called PC).

The printer system 2 is a standard printer system provided by the OS 1.

The input processing 6 controls input information from a keyboard, a mouse or other input device operated by a user.

The output processing 7 controls output information in which the input information is super imposed over an overlay form in order to output to a printer or other output device.

Information needed by the overlay control program, which is described later, is written on or read from the working storage area 9 of the recording medium 8.

A hardware configuration realizing the data converting apparatus 100 will now be described.

Figure 2:
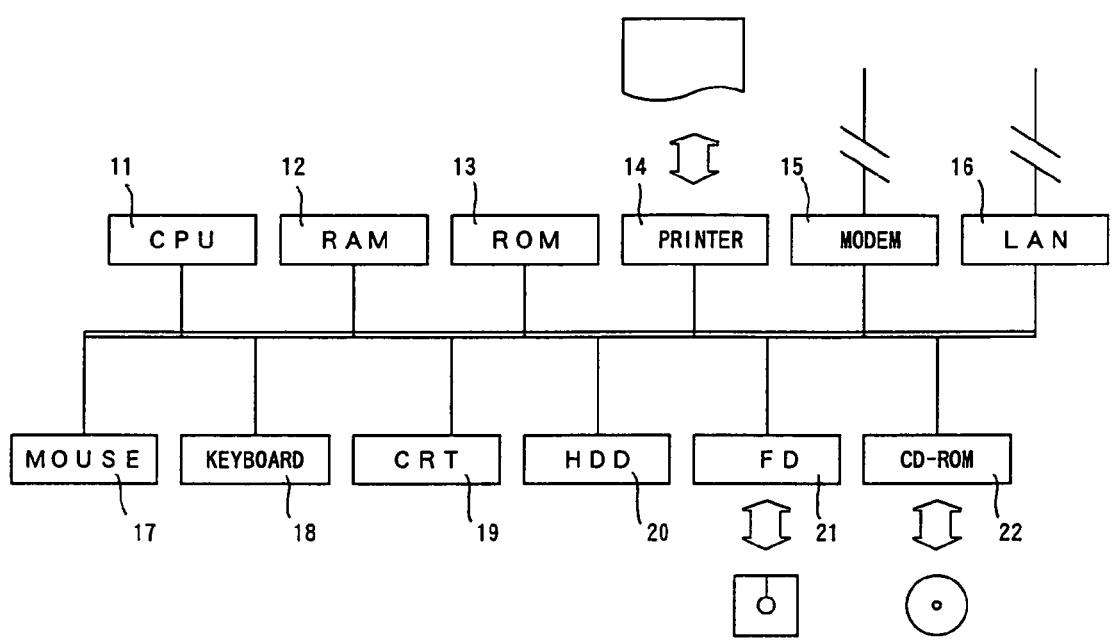
FIG. 2 is a diagram showing a hardware construction according to the embodiment of the present invention.

FIG. 2 is a diagram showing a hardware configuration according to the embodiment of the present invention.

In FIG. 2, the data converting apparatus 100 includes a CPU (Central Processing Unit) 11 to execute the overlay control program according to the present invention, RAM (Random Access Memory) 12 to temporarily store the overlay program and data, a HDD (Hard Disk Drive) 20 where the program is loaded and stored and needed tables are stored, a printer 14 to output superimposed information, a MODEM 15 and a LAN (Local Area Network) 16 through which other terminals access the data converting apparatus 100, a mouse 17 and a keyboard 18 to operate the apparatus 100 or to input necessary information, and a CRT (Cathode Ray Tube) 19 or similar video display to display necessary information for a user as an interface between the user and the apparatus 100. It should be noted that ROM (Read Only Memory) 13, a FD (Floppy Drive) 21 or similar removable magnetic storage or a CD-ROM (Compact Disk-Rom) 22 or similar removable optical storage may be provided to store the program and data in the apparatus 100, but any computer-readable medium that stores the program and data can be provided.

Figure 3:
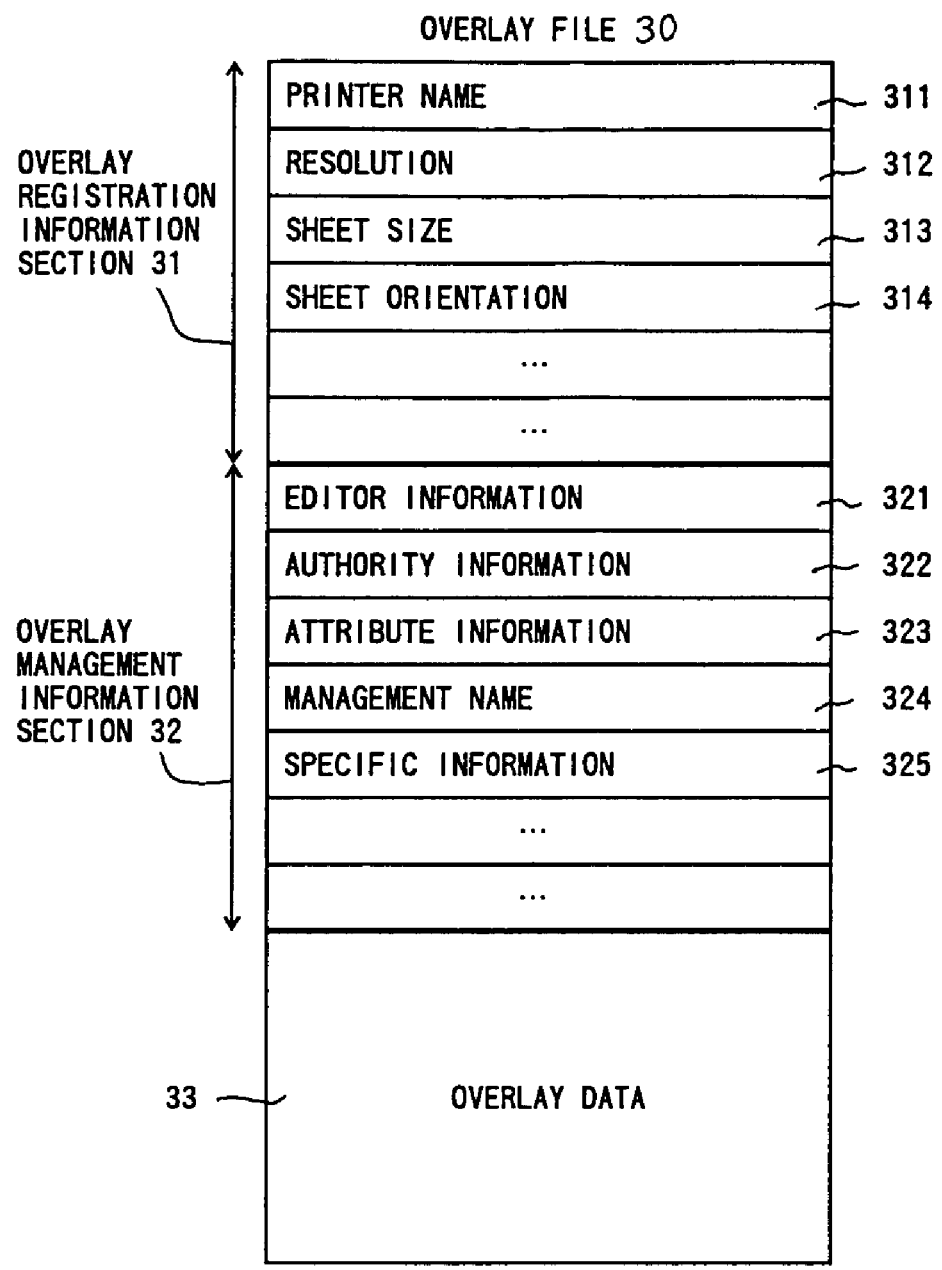
FIG. 3 is a diagram showing a data structure of an overlay information according to the embodiment of the present information.
Figure 4:
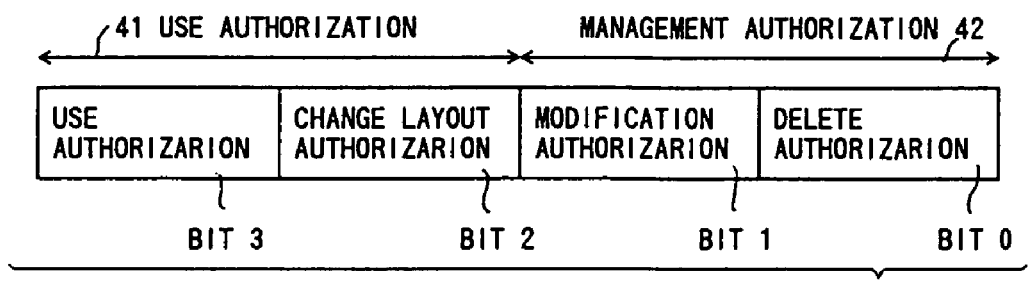
FIG. 4 is a diagram showing a data structure of an authorization information according to the embodiment of the present invention.
Figure 4:
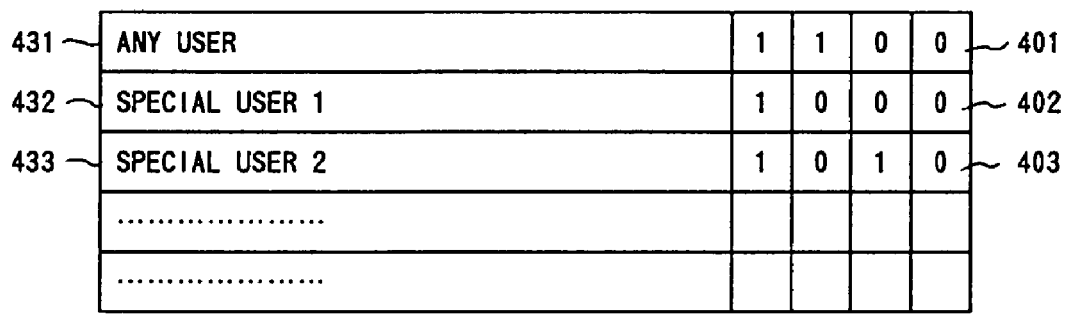

Information stored in the working storage area 9 in FIG. 1 will now be described with reference to FIG. 3 and FIG. 4 FIG. 3 is a diagram showing a data structure of overlay information according to the embodiment of the present invention.

In FIG. 3, an overlay file 30 corresponds to a file storing information concerning a single overlay form. The overlay file 30 includes three sections, an overlay registration information section 31, an overlay management information section 32 and an overlay data section 33. A plurality of overlay file 30 is required when a plurality of overlay form is required.

The overlay registration information section 31 further includes a printer name 311, a resolution 312, a sheet size 313, a sheet orientation 314 and other information.

The overlay management information section 32 further includes editor information 321, authorization information 322, attribute information 323, a management name 324, specific information 325 and other information.

FIG. 4 is a diagram showing a data structure of the authorization information 322 according to the embodiment of the present invention.

In FIG. 4, the authorization information 322 includes a user list 43 and a management information table 40.

In the user list 43, any user 431 is for any user other than a registration manager and special users 432, 433 and other special users. The special users 432, 433 and others indicate user information such as a user ID, a user name or the like when those users are authorized as special users differently from the user 431. Needed special users are listed after the user 431.

The management information table 40 uses four bits of the authorization information 322.

Each user record in the user list 43 includes management information. For example, the users 431, 432 and 433 correspond to management information 401, 402 and 403, respectively.

Also, each management information table 40 includes a use authorization 41 and a management authorization 42.

In the use authorization 41, a bit 3 shows a use authorization indicating whether a user is permitted to use an overlay form and a bit 2 shows an change layout authorization indicating whether the user is permitted to change a layout of the overlay form. It is assumed that in any bit, a bit value '1' indicates that a user is permitted and a bit value '0' indicates that the user is not permitted.

In the management authorization 42, a bit 1 shows a modification authorization indicating whether the user is permitted to modify information of the overlay form and a bit 0 shows a delete authorization indicating whether the user is permitted to delete the overlay form. It is assumed that in any bit, a bit value '1' indicates that a user is permitted and a bit value '0' indicates that the user is not permitted.

It is also assumed that the management information 401 for any user 431 is defined as a default such that any user is allowed to use and change a layout of the overlay form but not allowed to modify and delete the overlay form. In this case, the bit 3 is set to a value '1', the bit 2 is set to a value '1', the bit 1 is set to a value '0' and the bit 0 is set to a value '0'. If there is no special user in the user list, the management information 401 as a default is always used.

When management information for a special user is defined to authorize differently from the default, for example, the special user 432 is allowed to use but not change, modify or delete the overlay form. In this case, the bit 3 is set to a value '1', the bit 2 is set to a value '0', the bit 1 is set to a value '0' and the bit 0 is set to a value '0'.

The authorization information 322 and the management information table 40 are updated when an overlay form is registered or is managed.

An overlay control process executed by the overlay control program will now be described.

Figure 5:
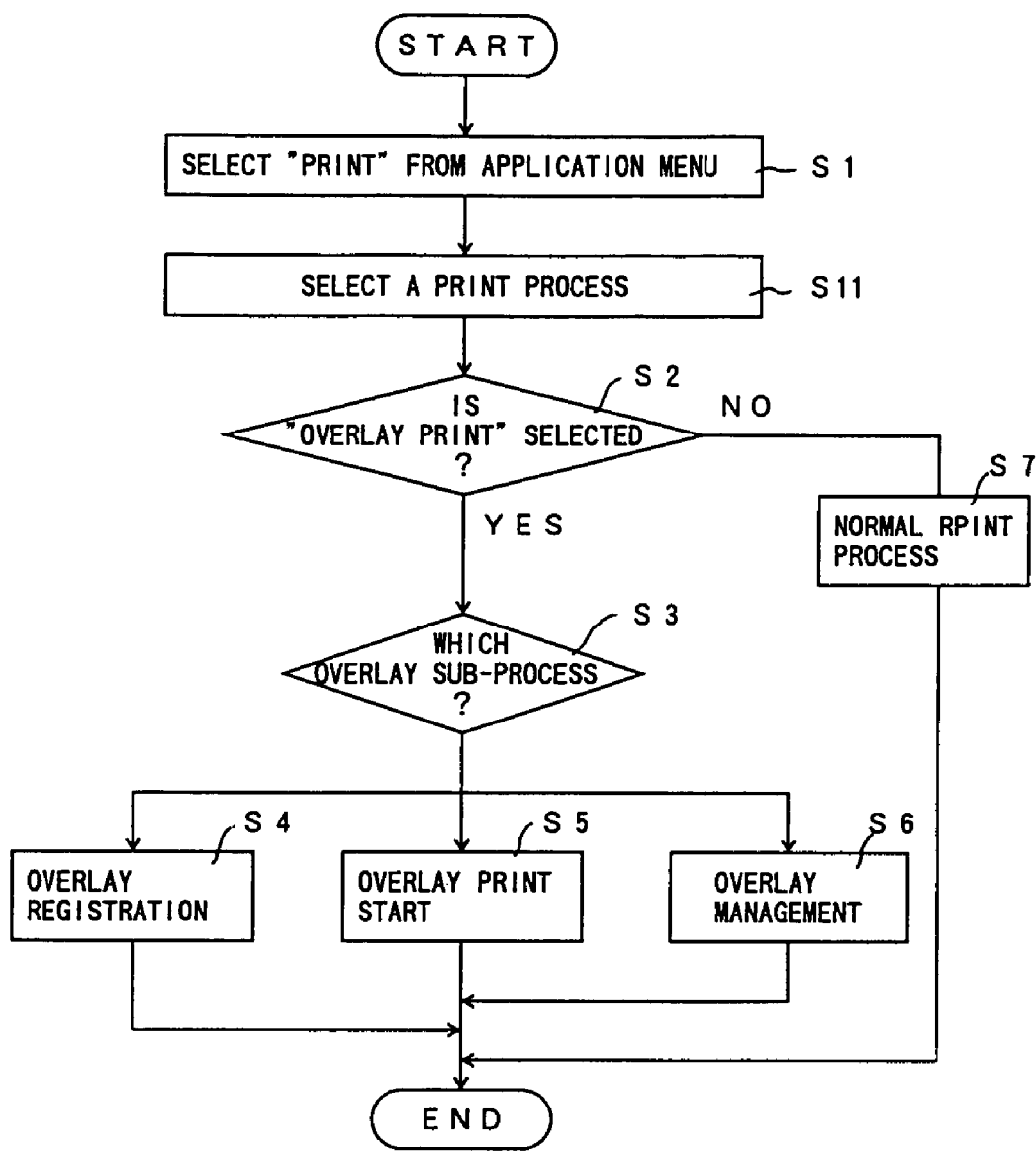
FIG. 5 is a flowchart for broadly explaining an overlay control process according to the embodiment of the present invention.

FIG. 5 is a flowchart for broadly explaining the overlay control process according to the embodiment of the present invention.

In FIG. 5, a user selects "print" from a menu provided in an application to create a new overlay form in step S1.

In step S11, a print window is displayed when "print" is selected from the menu. When the user desires a process concerning an overlay printing for superimposing input data or a document over an overlay form, the user selects "overlay print" from the print window and then selects either "overlay registration", "overlay print start" or "overlay management". The printer system 2 of the OS 1 in FIG. 1 indicates the process selected by the user to the print control part 5.

In step S11, the user may register the new overlay form by selecting a printer for overlay printing.

In step S2, the print control part 5 checks whether the user selects the "overlay print" or not. When the "overlay print" is not selected, the process goes to step S7 for a normal printing. When the "overlay print" is selected, the overlay control process goes to step S3.

In step S3, the print control part 5 checks which sub-process is selected. The overlay control process includes three sub-processes, mainly, an overlay registration, an overlay print start and an overlay management. In the case in which the overlay registration is selected, the overlay control process goes to step S4 to register the new overlay form. In the case in which the overlay print start is selected, the overlay control process goes to step S5. In the case in which the overlay management is selected, the overlay control process goes to step S6.

When the overlay registration is selected, in step S4, in order to create a new overlay file 30 in FIG. 3, the user sets information for the overlay registration information section 31 and the overlay management information section 32 shown in FIG. 3. The information set by the user and the new overlay form are stored in the new overlay file 30 in the working storage area 9 of the recording medium 8 in FIG. 1. After overlay registration is completed, the overlay control process is terminated.

When the user selects the overlay print start, in step S5, the user selects one of the overlay forms registered before, that is, one overlay file 30 of the overlay files 30 stored in the working storage area 9 is retrieved. Subsequently, information such as input data or text data is superimposed over the overlay form indicated by the overlay data 33 of the retrieved overlay file 30 as shown in FIG. 3. After the overlay print is completed, the overlay control process is terminated.

When the user selects the overlay management, in step S6, the selected overlay file 30 is retrieved from the working storage area 9 in order to modify or delete it. After the overlay management is completed, the overlay control process is terminated.

When in step S2 the user selects the normal print process, the overlay print goes to step S7. The printer system 2 as shown in FIG. 1 executes the data format converting part 4 to convert the data format. After the data conversion, the printer system 2 executes the print control 5 to print out from the printer 14 (shown in FIG. 2) based on the converted data format.

The overlay registration as a sub-process in the overlay control process will now be described.

Figure 6:
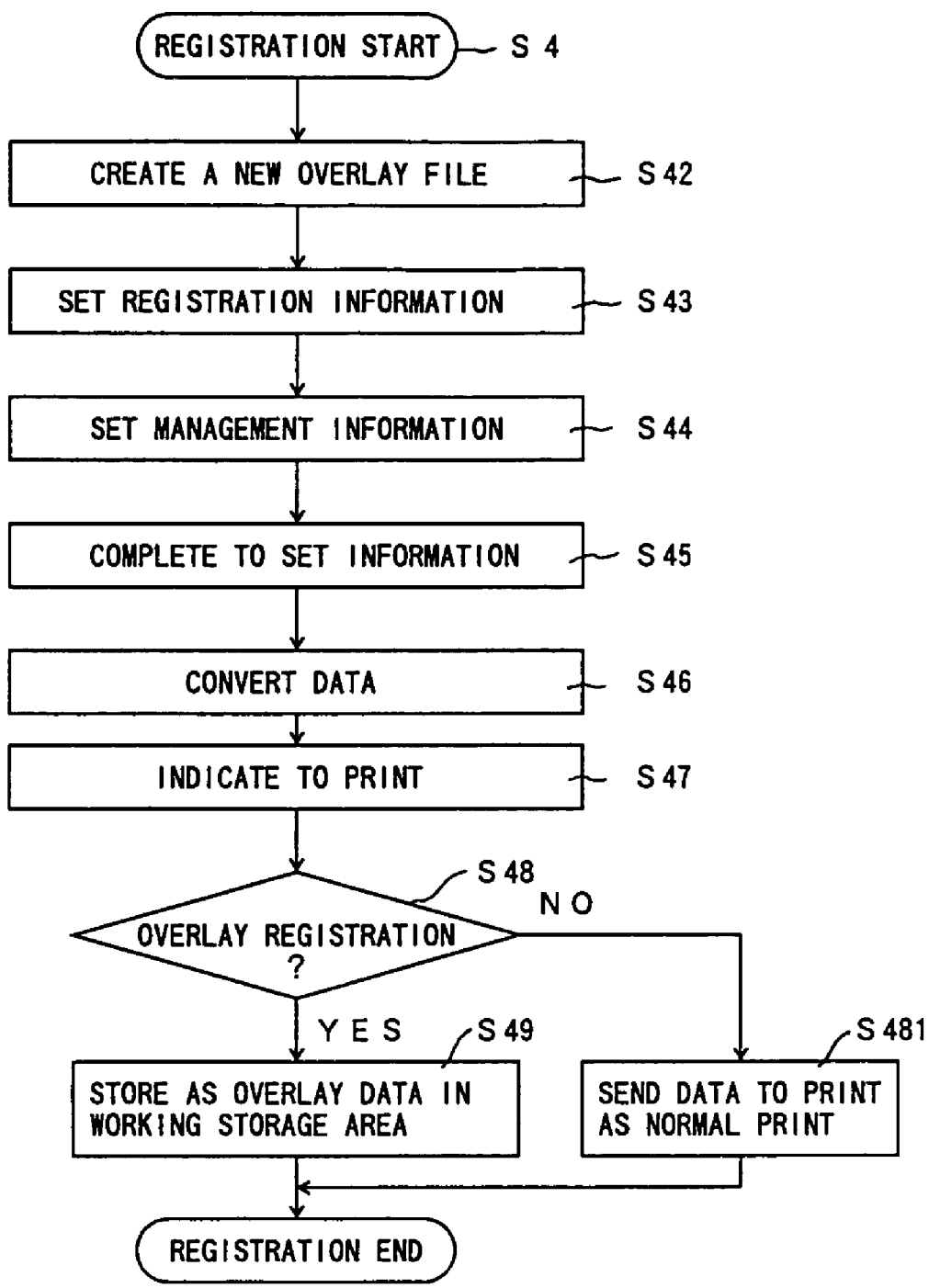
FIG. 6 is a flowchart for explaining an overlay registration according to the embodiment of the present invention.

FIG. 6 is a flowchart for explaining the overlay registration according to the embodiment of the present invention.

In step S42, the print control part 5 in FIG. 1 stores a new overlay file 30 including a new overlay form that a user creates and information thereof in the working storage area 9.

In step S43, the print control part 5 displays a window where the user sets information for the overlay registration information section 31, including the printer name 311, the resolution 312, the sheet size 313, the sheet orientation 314 and any additional information. Then, the print control part 5 stores the above information in the working storage area 9.

After step S43, in step S44, the print control part 5 displays another window where the user sets information for the overlay management information section 32, including the editor information 321, the authorization information 322, the attribute information 323, the management name 324, the specific information 325 and any additional information. Then, the print control part 5 stores the above information in the working storage area 9. The user may set information including the user list 43 and management information table 40 shown in FIG. 4 for the authorization information 322.

In step S45, the print control part 5 notifies the printer system 2 that all information is set, that is, the registration for the new overlay form is complete.

In step S46, the printer system 2 executes the data converting part 4 to convert the data format of the overlay form into another data format which a printer can process. After the conversion, the data converting part 4 notifies the printer system 2 that the conversion is complete.

The printer system 2 signals the print control part 5 to print out in step S47.

The print control part 5 checks whether the user selects the overlay registration in step S48. When the overlay registration is selected, the sub-process goes to step S49. When the overlay registration is not selected, the sub-process goes to step S481.

In step S481, the print control part 5 signals the output processing 7 for the normal print.

In step S49, when the print control part 5 judges that the overlay registration is selected in step S48, the overlay form converted by the data converting part 4 is stored in the overlay data 33 of the overlay file 30. The print control part 5 notifies the printer system 2 that the overlay registration is complete.

The overlay print sub-process will now be described.

Figure 7:
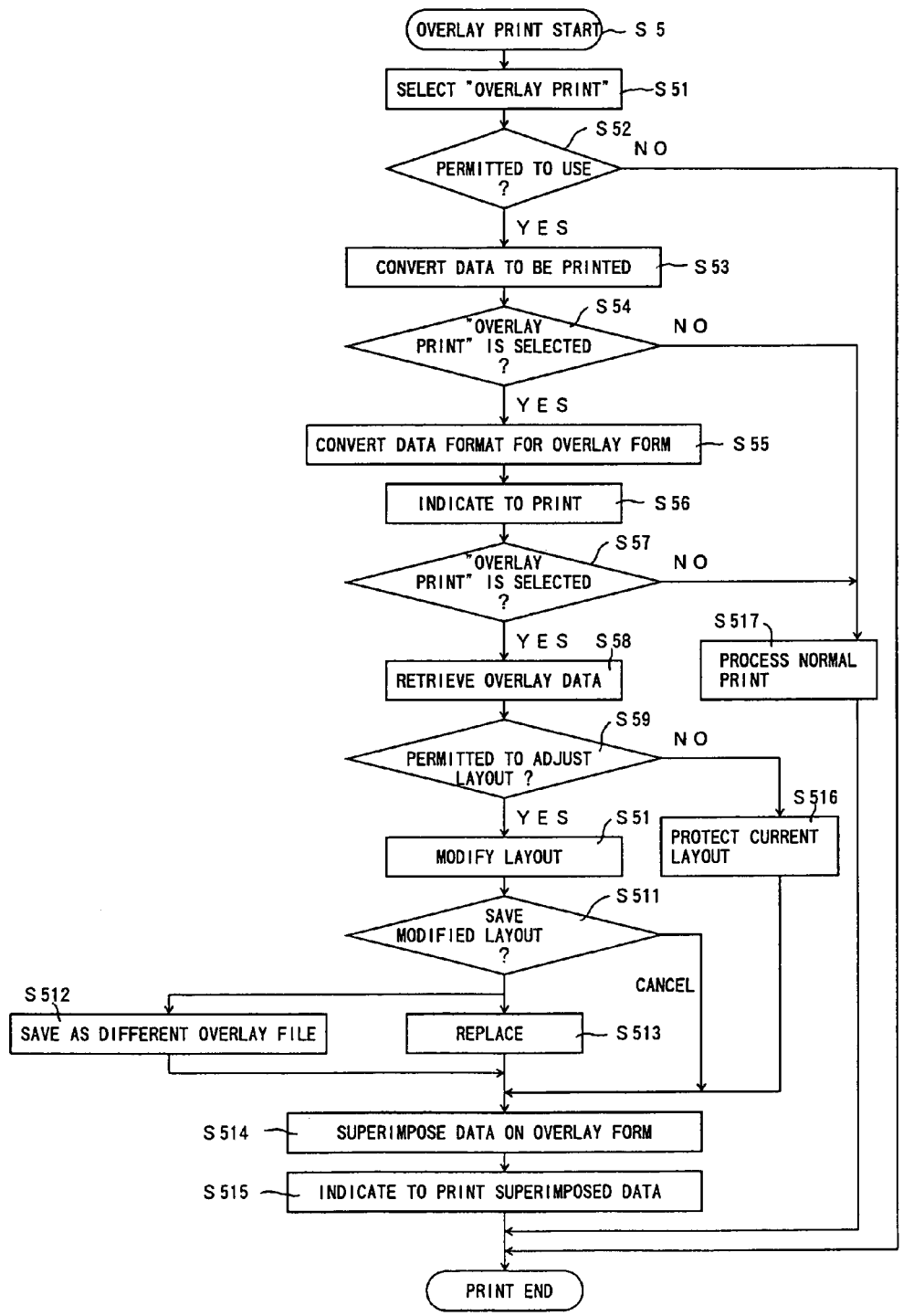
FIG. 7 is a flowchart for explaining an overlay print according to the embodiment of the present invention.

FIG. 7 is a flowchart for explaining the overlay print according to the embodiment of the present invention.

When the user selects the overlay print, an overlay form list window where the user selects one of overlay forms is displayed in step S51.

When the user selects one overlay form from the overlay form list window, the use authorization of the selected overlay form is checked in step S52. When the bit 3 of the use authorization 41 shown in FIG. 4 indicates a value '1', that is, the user is permitted to use the selected overlay form, the sub-process goes to step S53. When the bit 3 indicates a value '0', the user is not permitted, the sub-process is terminated.

In step S53, the printer system 2 signals the data converting part 4 to convert data to be printed by the printer 14.

In step S54, the data converting part 4 checks whether the overlay print is selected. When the overlay print is selected, the sub-process goes to step S55. When the overlay print is not selected, the sub-process goes to step S517.

In step S55, the data converting part 4 converts a data format into another data format to be printed and sends the printer system 2 the converted data format with the overlay form selected by the user.

The printer system 2 indicates the print control part 5 to print from the printer 14 in step S56.

The print control part 5 checks whether overlay print is indicated by information of the received data to be printed in step S57. When the information does not indicate the overlay print, the sub-process goes to step S517 for the normal print. When the additional information indicates the overlay print, the sub-process goes to step S58.

When the overlay print is indicated, the overlay data 33 of the selected overlay file 30 stored in the working storage area 9 is retrieved in step S58.

The overlay control part 5 checks whether it is permitted to change a layout of the selected overlay form on a sheet in step S59. When the bit 2 for the change layout authorization in the management table 40 of the overlay file 30 indicates a value '1', that is, when the user is permitted to change the layout, the sub-process goes to step S510. When the bit 2 indicates a value '0', that is, when the user is not permitted to change the layout, the sub-process goes to step S515.

When it is judged in step S59 that the user is permitted to change the layout, the print preview is displayed in step S510, which allows the user to change the layout.

The user selects to save, replace or cancel the overlay form whose layout is changed to a different overlay form, in step S511. When the user selects to save the changed overlay form as a different overlay form, the sub-process goes to step S512 to create another overlay form. When the user selects to replace the changed overlay form, the sub-process goes to step S513. When the user selects to cancel to store the changed overlay form, the sub-process goes to step S514 to start to print.

In step S512, in order to save as a different overlay form, another overlay file 30 for the changed overlay form is created and stored in the working storage area 9.

In step S513, in order to replace with the changed overlay form, the overlay data 33 of the overlay file 30 is replaced with data of the changed overlay form and stored in the working storage area 9.

In step S514, the print control part 5 controls to superimpose data on the overlay form, that is, the overlay data 33 of the overlay file 30.

In step S515, the print control part 5 controls the output processing part 7 in FIG. 1 to print out superimposed data.

In step S516, when it is judged in step S59 that the user is not permitted to change the layout of the overlay form on a sheet, the print preview which is protected not to change any data of the layout is displayed.

In step S517, when it is judged in step S57 that the overlay print is not indicated, the print control part 5 indicates the output processing part 7 to process the normal print.

The overlay management process will now be described.

Figure 8:
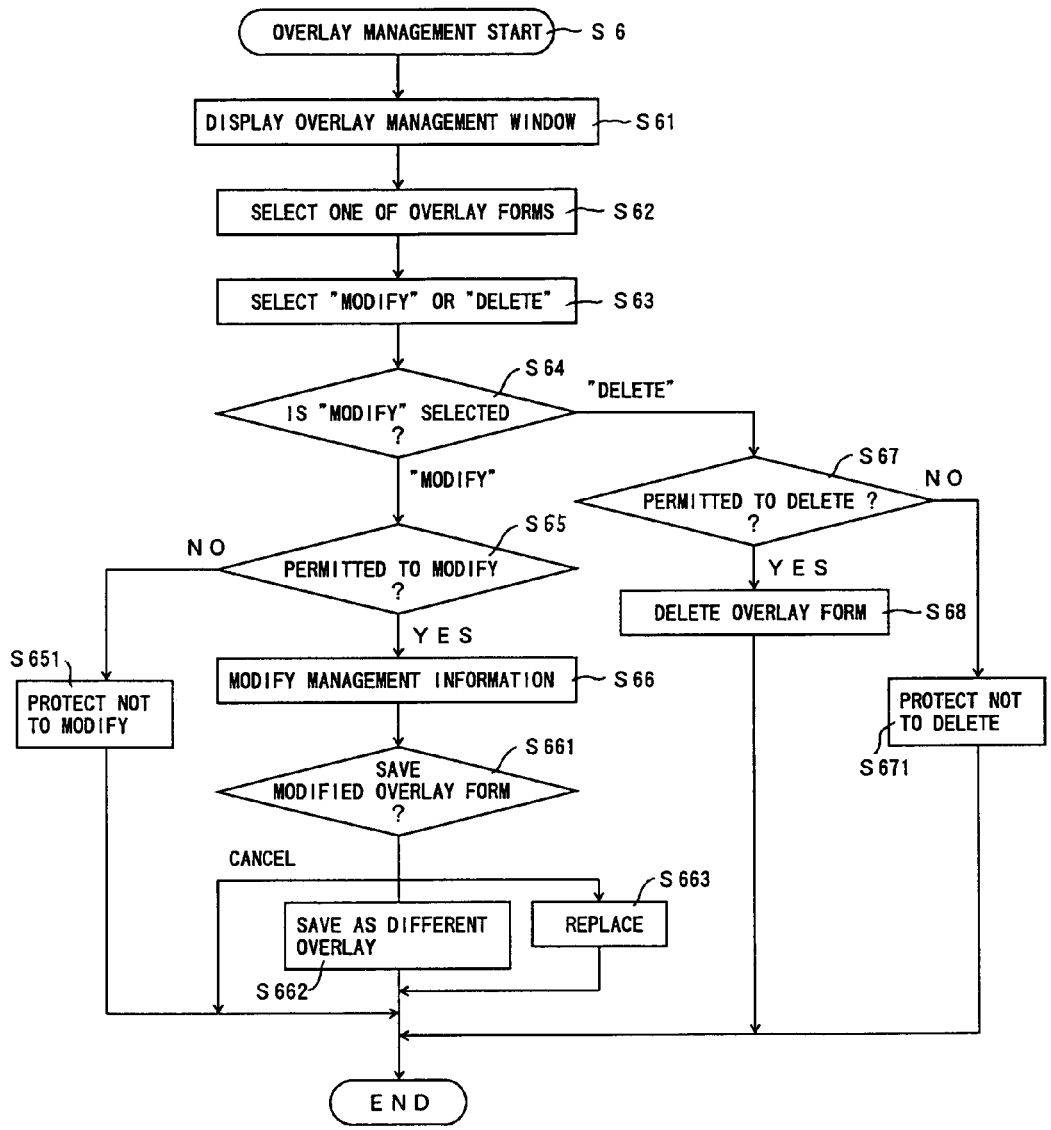
FIG. 8 is a flowchart for explaining an overlay management according to the embodiment of the present invention.

FIG. 8 is a flowchart for explaining the overlay management according to the embodiment of the present invention.

In FIG. 8, the overlay management window is displayed in step S61.

In step S62, the user selects one of the overlay forms registered before.

In step S63, the user selects to modify or delete the overlay form selected in step S62.

It is ascertained whether the user selects to modify the overlay form in step S64. When the user selects to modify, the sub-process goes to step S65 to check whether the user is permitted to modify. When the user selects to delete, the sub-process goes to step S67 to check whether the user is permitted to delete.

In step S65, it is ascertained whether the bit 1 indicating the modification authorization in the management table 42 indicate a value '1', that is, whether the user is permitted to modify the overlay form. When the bit 1 indicates a value '1', that is, when the user is permitted to modify the overlay form, the sub-process goes to step S66. When the bit 1 indicates a value '0', that is, when the user is not permitted to modify, the sub-process goes to step S651.

When it is judged in step S65 that the user is not permitted to modify the overlay form, information of the overlay file 30 is protected from modification in step S651.

When it is judged in step S65 that the user is permitted to modify, the user is allowed to modify information of the overlay file 30 in step S66.

In step S661, the user selects to save the changed management information as a different overlay form, replace with the management information changed by the user, or cancel. When the user selects to save as a different overlay form, the sub-process goes to step S662 to create another overlay file 30. When the user selects to replace, the sub-process goes to step S663. When the user selects to cancel, the sub-process is terminated.

When the user selects to save as a different overlay form, the current working overlay file 30 is copied and the copied overlay file 30 where information has been modified is saved as a different overlay file 30 in the working storage area 9 in step S662.

When the user selects to replace the overlay form, the overlay data 33 of the current working overlay file 30 is modified and saved as the same overlay file 30 in the working storage area 9.

When the user desires to delete the overlay form selected in step S64, it is ascertained whether the bit 0 of the management authorization 42 in FIG. 4 indicates a value '1' in step S67. When the bit 0 indicates a value '1', that is, when the user is permitted to delete the selected overlay form the sub-process goes to step S68. When the bit 0 indicates a value '0', that is, when the user is not permitted to delete the selected overlay form, the sub-process goes to step S671.

When it is judged in step S67 that the user is not permitted to delete, information concerning the selected overlay file 30 is protected from deletion in step S671. The sub-process is terminated.

When it is judged in step S67 that the user is permitted to delete, the selected overlay file 30 is deleted in step S68. The sub-process is terminated.

Figure 9:
FIG. 9 is a diagram showing an example of an output superimposed a text data over an overlay form according to the embodiment of the present invention.

FIG. 9 is a diagram showing an example of an output of data superimposed text data over an overlay form according to the embodiment of the present invention.

By processing the overlay registration and the overlay print, for example, when the user makes an address book, a new overlay file 30 which stores information concerning a form 9a for the address book as shown in FIG. 9 is created and stored in the working storage area 9 of FIG. 5 in step S4 of FIG. 1 so as to complete the overlay registration. The user may make address information 9b including name, zip code, address and other information as text data or a document by using an application and then the user may attempt the overlay print to superimpose the address information 9b over the form 9a. After the overlay print, such a superimposed output 9c may be printed out from the printer 14.

The printer driver 110 in FIG. 1 includes the overlay control process mentioned above. Therefore, any special application for the overlay print is not required. In addition, a printer is not required to have a storage area to store overlay forms. Furthermore, as mentioned above, any printer system having special functions other than the printer system 2 which is a part of the OS 1 is not required to operate the overlay registration, the overlay management, the overlay print and the normal print.

Moreover, by the authorization information 322, it is possible to manage user accesses via a network so that the data converting apparatus according to the present invention can be connected to the network via the modem 15 and the LAN 16 and remote users can be allowed to use the overlay print.

Therefore, it is possible for user to print superimposed data such that two different data files are superimposed to be one data file, without any special application. Also, no special operation is required for the user to print the superimposed data.

The present invention is not limited to the specifically disclosed embodiments, variations and modifications, and other variations and modifications may be made without departing from the scope of the present invention.

The present application is based on Japanese Priority Application No. 11-180229 filed Jun. 25, 1999, the entire contents of which are hereby incorporated by reference.

What is claimed is:

1. A data converting apparatus comprising:
a data converting part converting a set of input data into a set of image data that can be processed by an image forming apparatus forming an image on a medium in accordance with the set of image data;
a superimposing part superimposing at least a first set of image data converted from a first set of input data substantially prior to a time of printing and a second set of image data converted from a second set of input data different from the first set of input data, the second set of input data including non-image data, to generate a single set of superimposed image data;
a limiting part limiting use of the single set of superimposed image data in accordance with limitation information showing a limitation of use of the first set of input data;
the image forming apparatus forming an image on the medium based on the single set of superimposed image data;
the superimposing part superimposing the first and second sets of image data substantially when the image forming apparatus receives a command to form the image on the medium;
the limitation information including a first permission of a user to initiate the superimposing by the superimposing part, a second permission of a user to modify the first set of input data, and a third permission of a user to delete the first set of input data;
the first permission, the second permission, and the third permission being indicated by specified bits in the limitation information; and
limitation information for each user being stored in the first set of input data.

2. The data converting apparatus as claimed in claim 1, further comprising a data sending part sending the single set of superimposed image data to the image forming apparatus.

3. The data converting apparatus as claimed in claim 1, further comprising a form storing part selectively storing the set of image data converted from the set of input data as a predetermined form that is superimposed and storing the limitation information by associating the limitation information with the predetermined form.

4. The data converting apparatus as claimed in claimed 3, wherein the form storing part comprises a registration part registering the set of image data as a predetermined form that is superimposed.

5. The data converting apparatus as claimed in claim 3, further comprising a form selecting part selecting one of at least one predetermined form stored by the form storing part.

6. The data converting apparatus as claimed in claim 3, further comprising a form changing part changing the predetermined form stored by the form storing part.

7. The data converting apparatus as claimed in claim 6, further comprising a store control part selectively storing the predetermined form changed by the form changing part.

8. The data converting apparatus as claimed in claim 7, wherein the form changing part changes layout information of the predetermined form on the medium, which information the form storing part stores by associating with the predetermined form.

9. The data converting apparatus as claimed in claim 1, further comprising a previewing part previewing the single set of superimposed image data generated by the superimposing part.

10. A data converting apparatus comprising:
a data converting part converting a set of input data into a set of image data that can be processed by an image forming apparatus forming an image on a medium in accordance with the set of image data;
a superimposing part superimposing at least two sets of image data converted from at least two different sets of input data to generate a single set of superimposed image data, the image forming apparatus forming an image on the medium based on the single set of superimposed image data;
a form storing part selectively storing the set of image data converted from the set of input data as a predetermined form that is superimposed;
a limiting part limiting use of the predetermined form in accordance with limitation information showing a limitation of use of a first set of input data;
the limitation information including a first permission of a user to initiate the superimposing by the superimposing part, a second permission of a user to modify the first set of input data, and a third permission of a user to delete the first set of input data;

the first permission, the second permission, and the third permission being indicated by specified bits in the limitation information; and limitation information for each user being stored in the first set of input data.

11. A method for converting data comprising:

converting a set of input data into a set of image data that can be processed by an image forming apparatus forming an image on a medium in accordance with the set of image data;

superimposing at least a first set of image data converted from a first set of input data substantially prior to a time of printing and a second set of image data converted from a second set of input data different from the first set of input data, the second set of input data including non-image data, to generate a single set of superimposed image data;

limiting use of the single set of superimposed image data in accordance with limitation information showing a limitation of use of the first set of input data;

forming an image on the medium based on the single set of superimposed image data;

superimposing the first and second sets of image data substantially when a command is received to form the image on the medium;

the limitation information including a first permission of a user to initiate the superimposing, a second permission of a user to modify the first set of input data, and a third permission of a user to delete the first set of input data;

the first permission, the second permission, and the third permission being indicated by specified bits in the limitation information; and limitation information for each user being stored in the first set of input data.

12. The method for converting data as claimed in claim 11, further comprising sending the single set of superimposed image data to the image forming apparatus.

13. The method as claimed in claim 11, wherein said superimposing superimposes at least one set of image data over another set of image data that is converted from the set of input data and stored as a predetermined form.

14. The method as claimed in claim 13, wherein said superimposing selects a desired form from at least one predetermined form and superimposes at least one set of image data over the desired form.

15. The method as claimed in claim 13, wherein said superimposing enables changing of the predetermined form.

16. The method as claimed in claim 13, wherein said superimposing enables changing of layout information that indicates a position where the predetermined form is formed on the medium and is stored by associating the layout information with the predetermined form.

17. The method as claimed in claim 11, further comprising previewing the single set of superimposed image data generated by said superimposing.

18. A method for converting data comprising:

converting a set of input data into a set of image data that can be processed by an image forming apparatus forming an image on a medium in accordance with the set of image data;

superimposing at least two sets of image data converted from at least two different sets of input data to generate a single set of superimposed image data;

forming an image on the medium based on the single set of superimposed image data;

limiting use of the predetermined form in accordance with limitation information showing a limitation of use of a first set of input data;

the limitation information including a first permission of a user to initiate the superimposing, a second permission of a user to modify the first set of input data, and a third permission of a user to delete the first set of input data;

the first permission, the second permission, and the third permission being indicated by specified bits in the limitation information; and limitation information for each user being stored in the first set of input data.

19. A computer-readable recording medium recorded with a program for controlling a computer to convert data, the program comprising a process of:

converting a set of input data into a set of image data that can be processed by an image forming apparatus forming an image on a medium in accordance with the set of image data;

superimposing at least a first set of image data converted from a first set of input data substantially prior to a time of printing and a second set of image data converted from a second set of input data different from the first set of input data, the second set of input data including non-image data, to generate a single set of superimposed image data;

limiting use of the single set of superimposed image data in accordance with limitation information showing a limitation of use of the first set of input data;

forming an image on the medium based on the single set of superimposed image data;

superimposing the first and second sets of image data substantially when the image forming apparatus receives a command to form the image on the medium;

the limitation information including a first permission of a user to initiate the superimposing, a second permission of a user to modify the first set of input data, and a third permission of a user to delete the first set of input data;

the first permission, the second permission, and the third permission being indicated by specified bits in the limitation information; and limitation information for each user being stored in the first set of input data.

20. The computer-readable recording medium as claimed in claim 19, further comprising sending the single set of superimposed image data to the image forming apparatus.

21. The computer-readable recording medium as claimed in claim 19, wherein said superimposing superimposes at least one set of image data over another set of image data that is converted from the set of input data and stored as a predetermined form.

22. The computer-readable recording medium as claimed in claim 21, wherein said superimposing enables changing of the predetermined form.

23. The computer-readable recording medium as claimed in claim 21, wherein said superimposing enables changing of layout information that indicates a position where the predetermined form is formed on the medium and is stored by associating the layout information with the predetermined form.

24. The computer-readable recording medium as claimed in claim 19, wherein said superimposing selects a desired form from at least one predetermined form and superimposes at least one set of image data over the desired form.

25. The computer-readable recording medium as claimed in claim 19, further comprising previewing the single set of superimposed image data generated by said superimposing.

26. A computer-readable recording medium recorded with a program for controlling a computer to convert data, the program comprising a process of:
- converting a set of input data into a set of image data that can be processed by an image forming apparatus forming an image on a medium in accordance with the set of image data;
- superimposing at least two sets of image data converted from at least two different sets of input data to generate a single set of superimposed image data;
- forming an image on the medium based on the single set of superimposed image data; and
- limiting use of the predetermined form in accordance with limitation information showing a limitation of use of a first set of input data;
- the limitation information including a first permission of a user to initiate the superimposing, a second permission of a user to modify the first set of input data, and a third permission of a user to delete the first set of input data;
- the first permission, the second permission, and the third permission being indicated by specified bits in the limitation information; and
- limitation information for each user being stored in the first set of input data.

* * * * *

UNITED STATES PATENT AND TRADEMARK OFFICE
CERTIFICATE OF CORRECTION

| | | |
|---|---|---|
| PATENT NO. | : 7,110,146 B1 | Page 1 of 1 |
| APPLICATION NO. | : 09/537342 | |
| DATED | : September 19, 2006 | |
| INVENTOR(S) | : Hironori Morito et al. | |

It is certified that error appears in the above-identified patent and that said Letters Patent is hereby corrected as shown below:

Column 10, Line 27, after "claimed in" change "claimed" to --claim--.

Signed and Sealed this

First Day of May, 2007

JON W. DUDAS
*Director of the United States Patent and Trademark Office*